US009437853B2

(12) United States Patent
Kang et al.

(10) Patent No.: US 9,437,853 B2
(45) Date of Patent: Sep. 6, 2016

(54) APPARATUS FOR PREVENTING DEFORMATION OF PLASTIC BATTERY PACK CASE FOR A VEHICLE

(71) Applicants: Hyundai Motor Company, Seoul (KR); Kia Motors Corporation, Seoul (KR)

(72) Inventors: Hyun Min Kang, Gyeonggi-Do (KR); Chi Hoon Choi, Gyeonggi-Do (KR); Cheol Choi, Gyeonggi-Do (KR); Tae Min Park, Busan (KR); Myeong Gi Kim, Busan (KR); Soo Kil Shim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 14 days.

(21) Appl. No.: 14/689,741

(22) Filed: Apr. 17, 2015

(65) Prior Publication Data
US 2015/0228946 A1 Aug. 13, 2015

Related U.S. Application Data

(62) Division of application No. 13/298,537, filed on Nov. 17, 2011, now Pat. No. 9,034,504.

(30) Foreign Application Priority Data

Sep. 7, 2011 (KR) .......................... 10-2011-0090936

(51) Int. Cl.
*H01M 2/10* (2006.01)
*B60K 1/04* (2006.01)
*B60L 11/18* (2006.01)

(52) U.S. Cl.
CPC .............. *H01M 2/1083* (2013.01); *B60K 1/04* (2013.01); *B60L 11/1874* (2013.01); *B60L 11/1879* (2013.01); *H01M 2/1072* (2013.01); *Y02T 10/7005* (2013.01); *Y02T 10/705* (2013.01); *Y10T 29/49826* (2015.01)

(58) Field of Classification Search
CPC ................................................... H01M 2/1072
See application file for complete search history.

(56) References Cited

FOREIGN PATENT DOCUMENTS

| JP | 10-006785 | 1/1998 |
|---|---|---|
| JP | 2009-083600 | 4/2009 |
| KR | 10-2005-0022604 | 3/2005 |
| KR | 10-2006-0037738 | 5/2006 |

*Primary Examiner* — Barbara Gilliam
*Assistant Examiner* — Stephan Essex
(74) *Attorney, Agent, or Firm* — Mintz Levin Cohn Ferris Glovsky and Popeo, P.C.; Peter F. Corless (57) ABSTRACT

Disclosed is an apparatus and method for preventing deformation of a plastic battery pack case for a vehicle, in which the side of the battery pack case is subjected to reverse deformation to absorb the deformation occurring after compression molding and to ensure the dimensions of a mounting portion of various components including battery packs, thereby ensuring an internal space of the battery pack case. To this end, the present invention provides an apparatus for preventing deformation of a plastic battery pack case for a vehicle, the apparatus including: a base having a case insertion space; a fixing portion for fixing a battery pack case inserted into the case insertion space; and a deformation producing portion inserted into the battery pack case and preventing the case from being deformed by pressing the inside of the case to be reversely deformed in the lateral direction.

9 Claims, 7 Drawing Sheets

APPARATUS FOR PREVENTING DEFORMATION OF PLASTIC BATTERY PACK CASE FOR A VEHICLE

CROSS-REFERENCE TO RELATED APPLICATION

This application is a divisional application of U.S. application Ser. No. 13/298,537, filed Nov. 17, 2011, which claims under 35 U.S.C. §119(a) the benefit of Korean Patent Application No. 10-2011-0090936 filed Sep. 7, 2011, the entire contents of which are incorporated herein by reference.

BACKGROUND (a) Technical Field

The present invention relates to an apparatus for preventing deformation of a plastic battery pack case for an electric or hybrid vehicle. More particularly, it relates to an apparatus for preventing deformation of a plastic battery pack case, mounted on a lower portion of a vehicle, after compression molding.

(b) Background Art

In general, a battery pack case assembly mounted in a vehicle, and more particular in an electric or hybrid vehicle includes a battery pack, a battery management system, a blower, an upper cover, a lower case, structure reinforcing members, etc. While the upper cover does not receive a load and thus can be formed by a typical plastic composite molding process, the lower case and the structure reinforcing members are formed of steel formed by press molding to bear the load of a battery received in the case.

Figure 1:
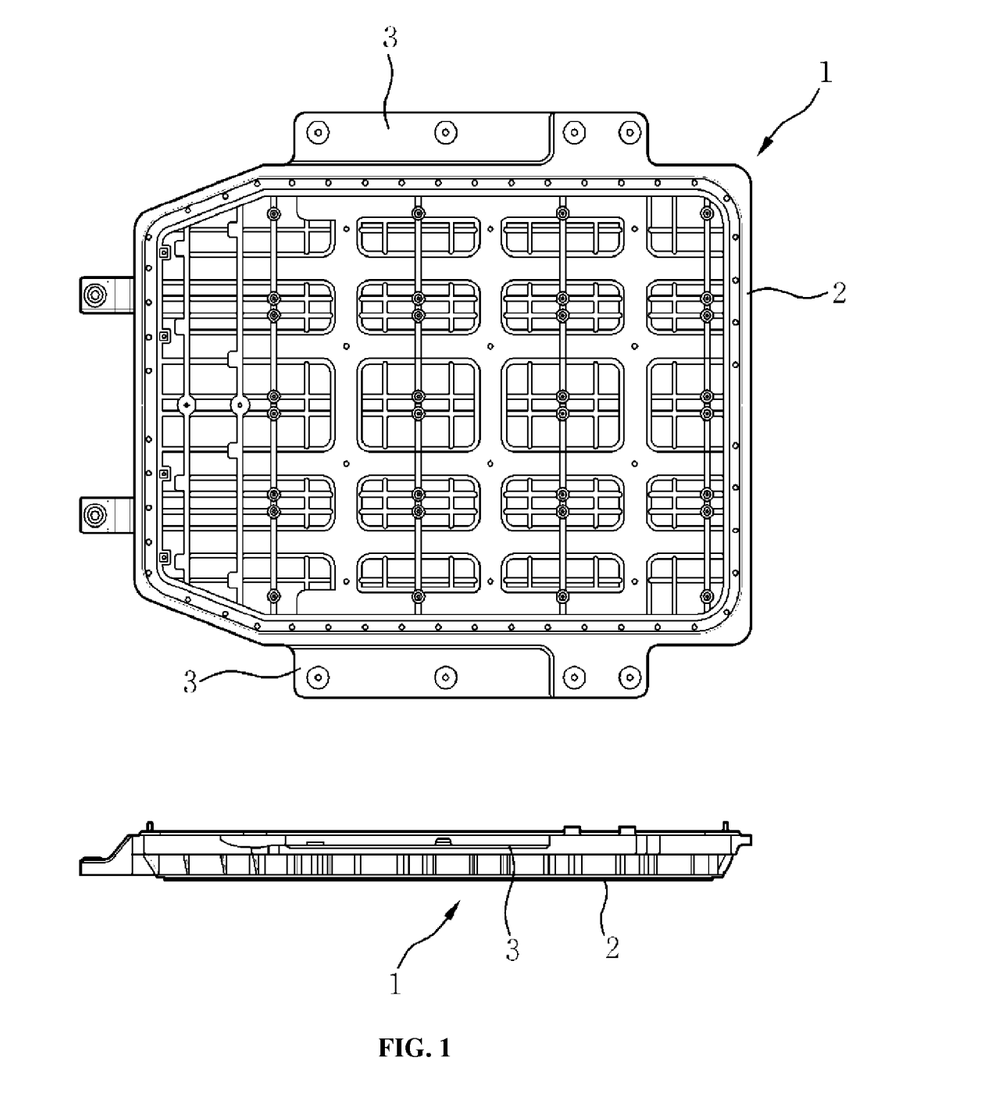
FIG. 1 is a plan view and a side view showing a typical structure of a plastic battery pack case for an electric vehicle, which is formed of a plastic composite material.

However, a technique for replacing the steel material of the existing lower case with a plastic composite material has been developed to reduce the weight of the vehicle, which is disclosed in U.S. patent application Ser. No. 13/039,806. A plastic battery pack case 1 for an electric vehicle, which is formed of a plastic composite material, typically has an upwardly open box structure. As shown in FIG. 1, the plastic battery pack case 1 comprises a case body 2, which accommodates various components required for the operation of an electric vehicle battery including a plurality of battery packs, and a mounting portion 3, which projects from the edge of the case body 2 to the outside and is fastened to the lower portion of the vehicle through insert-molded nuts. The plastic battery pack case 1 is mainly formed of a composite material comprising a matrix containing polyamide and polypropylene and reinforced with glass fibers and carbon fibers by a compression molding process.

Moreover, the plastic battery pack case 1 may be formed by an in-line compounding/extrusion deposition and molding process as disclosed in U.S. Pat. Nos. 6,444,153B1 and 6,165,604A.

However, the polyamide and polypropylene mainly used in the matrix are semi-crystalline polymers and deformed by contraction of the polymer matrix after molding. Such deformation is related to the degree of crystallization of the material depending on the thermal history. After compression molding, heat transfer does not occur uniformly in the plastic battery pack case, and thus a difference in cooling rate occurs to produce a tension in the cooling solid, thereby causing deformation. Therefore, the compression-molded plastic battery pack case 1 is deformed by contraction after compression molding, and thus it is difficult to ensure the proper internal space for mounting the case, which makes it difficult to easily mount the battery packs.

In other words, as the battery pack case 1 contracts in the longitudinal and width directions after compression molding, the internal space for accommodating the battery packs is reduced, and thus it is very difficult to mount the battery packs in the case.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus for preventing deformation of a plastic battery pack case for a vehicle, in which the side of the plastic battery pack case is subjected to reverse deformation to absorb the deformation occurring after compression molding and to ensure the dimensions of a mounting portion of various components including battery packs, thereby ensuring an internal space of the battery pack case.

In one aspect, the present invention provides an apparatus for preventing deformation of a plastic battery pack case for a vehicle, the apparatus comprising: a base having a case insertion space; a fixing portion for fixing a battery pack case inserted into the case insertion space; and a deformation producing portion inserted into the battery pack case and preventing the case from being deformed by pressing the inside of the case to be reversely deformed in the lateral direction.

In an exemplary embodiment, the fixing portion may include an upright portion fixed to the base; an operating lever connected to the upright portion and an arm portion through link members by a hinge structure and generating a rotational force. The arm portion may be connected to an upper end of the upright portion by a hinge structure and converting a rotary motion of the operating lever into an up-and-down linear motion. Furthermore, a pressing portion may be mounted on the front end of the arm portion. A mounting portion of the case may be fixed by receiving the up-and-down linear motion converted by the arm portion. As the pressing portion is connected to the front end of the arm portion to slide toward the outside of the case, the case may be prevented from being deformed inwardly, while the side of the case can be deformed outwardly by the reverse deformation producing portion.

In another exemplary embodiment, the fixing portion may also include a plurality of fixing portions provided on edges of the base along vehicle body mounting portions of the case at regular intervals. The reverse deformation producing portion may include a reverse deformation applying block disposed to be in contact with the inside of the case to outwardly deform the side of the case; a ratchet handle for generating a rotational force; and a bolt portion and a nut portion for converting the rotational force of the ratchet handle into a linear movement force to press the side of the case and transmitting the linear movement force to the reverse deformation applying block. The reverse deformation producing portion may be inserted into the case by a support frame connected to the base by a hinge structure to outwardly deform the side of the case.

Furthermore, the support frame may include a guide member arranged in the width direction of the base, the guide member inserted into a shake prevention guide arranged in the width direction of the base at regular intervals to prevent the case from being shaken when reverse deformation is applied to the case.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

1: case
2: case body
3: mounting portion
4: strand
10: base
11: support
12: shake prevention guide
13: fixing portion
14: operating lever
15: upright portion
16: arm portion
17: pressing portion
18: first link member
19: second link member
20: reverse deformation producing portion
21: ratchet handle
22: handle rod portion
23: rotating portion
24: bolt portion
25: nut portion
26: reverse deformation applying block
27: thrust bearing
28: radial bearing
29: sprocket
30: chain
31: driving portion
40: support frame
41: support plate
42: upper frame
42: side member
44: lower frame
45: guide member It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 2:
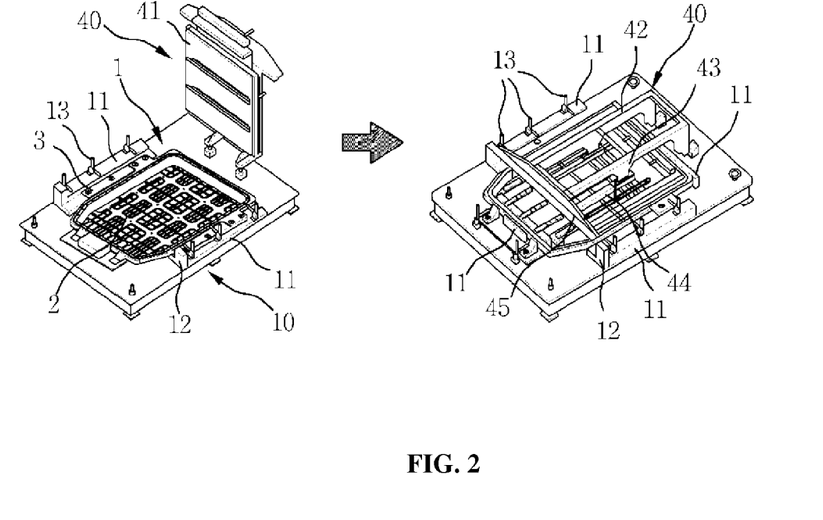
FIG. 2 is a perspective view showing a process of inserting a plastic battery pack case into an apparatus for preventing deformation of a plastic battery pack case for an electric vehicle in accordance with an exemplary embodiment of the present invention and applying reverse deformation thereto.
Figure 3:
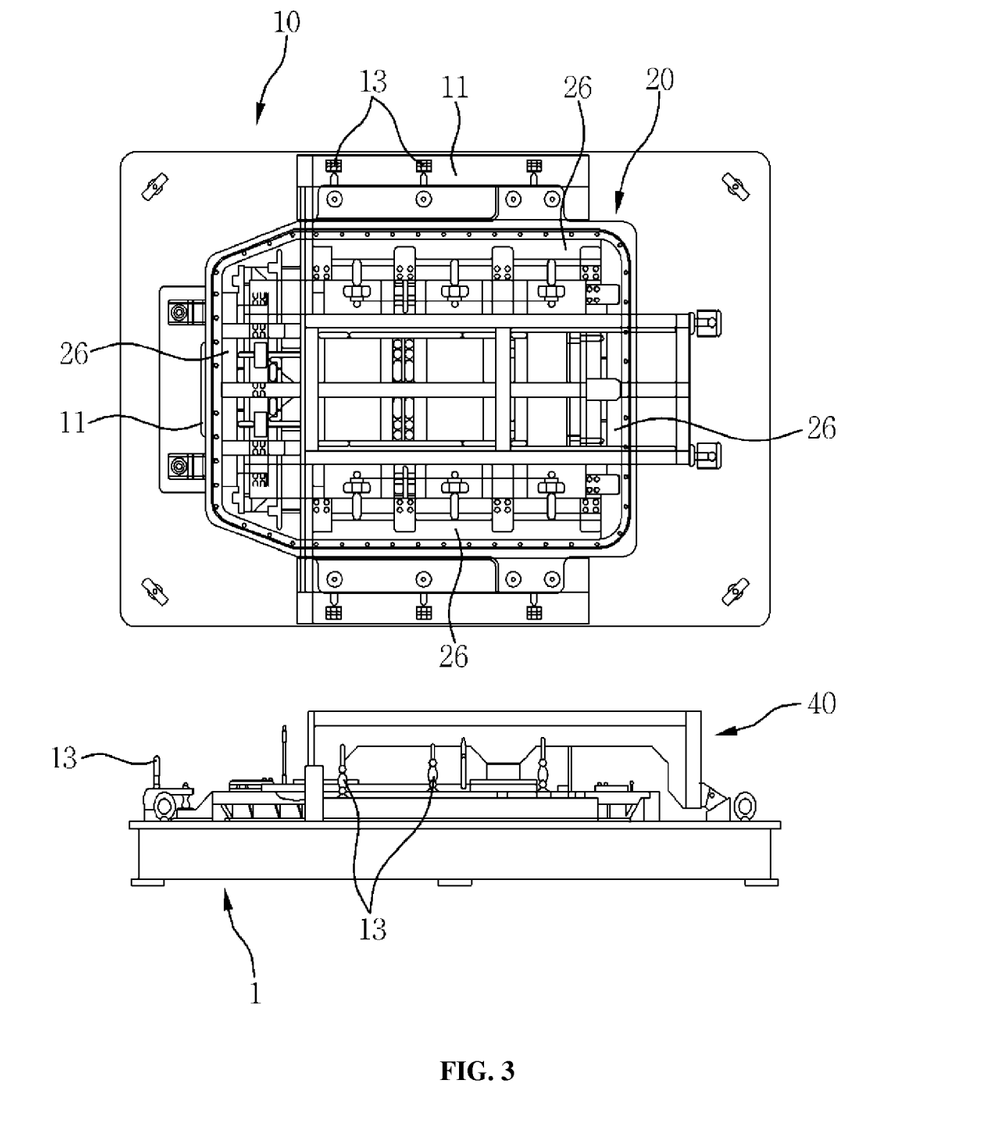
FIG. 3 is a plan view and a side view of FIG. 2.

FIG. 2 is a perspective view showing a process of inserting a plastic battery pack case 1 into an apparatus for preventing deformation of a plastic battery pack case for a vehicle, e.g., an electric or hybrid vehicle, in accordance with an exemplary embodiment of the present invention and applying reverse deformation thereto, and FIG. 3 is a plan view and a side view of FIG. 2.

The present invention provides an apparatus for preventing deformation of a plastic battery pack case 1 (hereinafter referred to as a case), which can prevent deformation of the case 1 occurring after compression molding, thus ensuring a proper internal space for the case 1 for accommodating battery packs.

According to the apparatus for preventing deformation of a plastic battery pack case, it is possible to prevent deformation of the plastic battery case 1 due to contraction after compression molding so that after the compression-molded, case 1 is fixedly mounted in the internal space provided in the deformation preventing apparatus, the side edges of the case 1 are subjected to reverse deformation toward the outside of the case 1 and rapidly cooled by air circulation.

To this end, the apparatus for preventing deformation of a plastic battery pack case in accordance with an exemplary embodiment of the present invention comprises a base 10 for receiving a product, a fixing portion 13 for fixing a mounting portion 3 of the case 1, and a reverse deformation producing portion 20 for preventing deformation due to contraction after compression molding. The base 10 has preferably a rectangular structure having a flat surface at the top to fixedly receive a product, i.e., the case 1 for accommodating of battery packs. However, the shape of the base 10 is not limited to a rectangular shape and can be any shape capable of fixedly receiving the product.

A support 11 is provided at each of four edges of the base 10 to fixedly receive the mounting portion 3 of the case 1. Here, a case insertion space is provided between the supports 11 disposed at the four edges of the base 10. When the case 1 is inserted into the case insertion space, the mounting portion 3 of the case 1 can be supported by the support 11.

Figure 4:
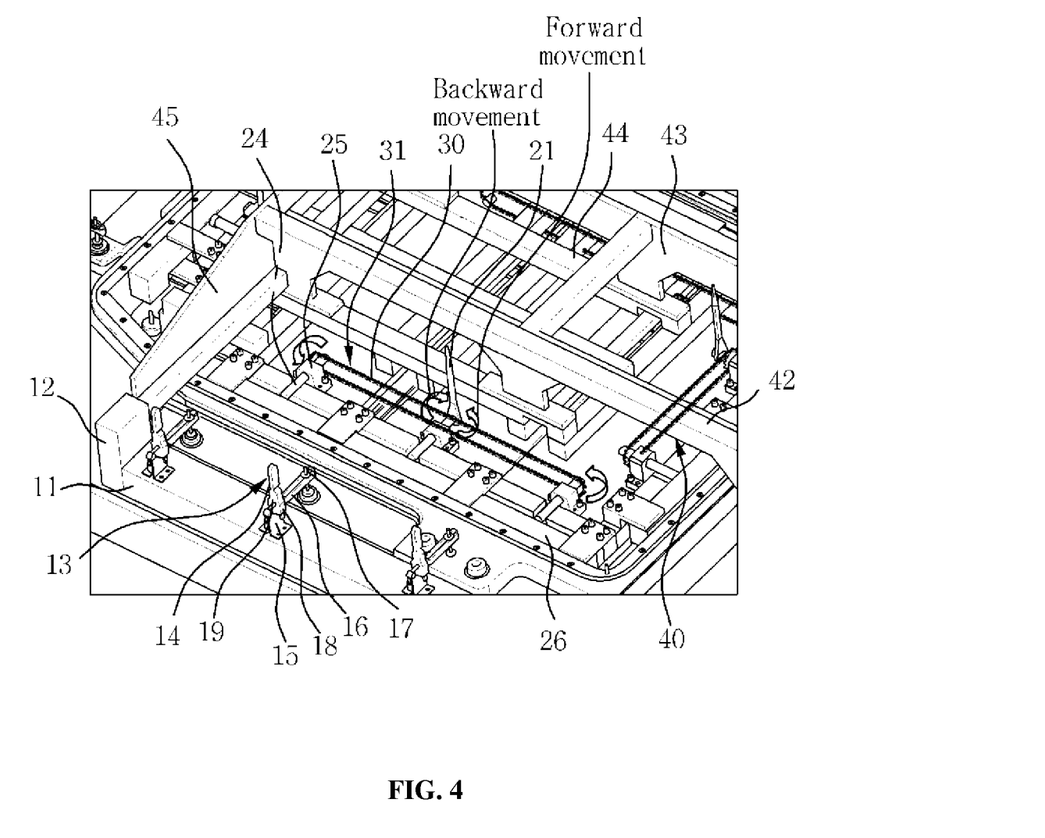
FIG. 4 is an enlarged view of a fixing portion and a shake prevention guide of FIG. 2.

FIG. 4 is an enlarged view of a fixing portion 13 and a shake prevention guide of FIG. 2. A plurality of fixing portions 13 are provided on or adjacent to the support 11 along the edges of the case 1 at regular intervals to fix the mounting portion 3 of the case 1 placed on the support 11. The mounting portion 3 of the case 1 corresponds to a portion where the case 1 is mounted on a lower portion of the vehicle.

Generally, the plastic battery pack case 1 formed by a compression molding process is deformed toward the inside of the case 1 due to contraction immediately after the case 1 is removed from a mold. Here, the fixing portion 13 functions to fix the mounting portion 3 of the compression-molded case 1 to minimize the contraction of the product until the case 1 is subjected to reverse deformation.

Moreover, the fixing portion 13 fixes the mounting portion 3 of the case 1 inserted into the case insertion space to prevent the case 1 from contracting inwardly but at the same time allow the case 1 to move outwardly, thus allowing reverse deformation of the case 1. Each fixing portion 13 includes an upright portion 15 fixedly provided in the vertical direction, an arm portion 16 projecting from an upper end of the upright portion 15 toward the mounting portion 3 of the case 1, a pressing portion 17 connected to the front end of the arm portion 16 and pressing the mounting portion 3 of the case 1, and an operating lever 14 connected to the upright portion 15 by a hinge structure and pressing and releasing the pressing portion 17.

The arm portion 16 may be a hinge-connected to the upper end of the upright portion 15, and be configured to convert the rotational force generated by the operating lever 14 into an up-and-down motion, transmit the up-and-down motion to the pressing portion 17, and guide the movement of the pressing portion 17 toward the outside of the case 1.

The operating lever 14 is connected to the upright portion 15 through a first link member 18 and connected to the arm portion 16 through a second link member 19. An upper end of the first link member 18 is connected to a lower end of the operating lever 14, and a lower end of the first link member 18 is connected to the upright portion 15 by a hinge structure. The second link member 19 is located inside the first link member 18 and operated independently from the first link member 18. An upper end of the second link member 19 is connected to a lower end of the operating lever 14, and a lower end of the second link member 19 is connected to the arm portion 16 by a hinge structure.

The operation of each fixing portion 13 is as follows. When the operating lever 14 is pulled toward the outside of the case 1, the rotational force of the operating lever 14 is transferred through the arm portion 16 into a descending force (i.e., pressing force) of the pressing portion 17 mounted on the front end of the arm portion 16, and thus the pressing portion 17 presses the mounting portion 3 of the case 1 by the pressing force, thereby fixing the mounting portion 3 of the case 1 to the support 11.

Conversely, when the operating lever 14 is pushed toward the inside of the case 1, the rotational force of the operating lever 14 is transferred through the arm portion 16 into an ascending force (i.e., releasing force) of the pressing portion 17, and thus the pressing portion 17 is separated from the mounting portion 3 of the case 1 by the releasing force, thereby separating the case 1 from the fixing portion 13.

Moreover, as the pressing portion 17 is slidably inserted into the front end of the arm portion 16 toward the outside of the case 1, the pressing portion 17 is blocked by the front end of the arm portion 16 and thus cannot move toward the inside of the case 1. Therefore, when reverse deformation is applied to the case 1 to ensure proper internal space of the case 1 in a state where the pressing portion 17 fixes the mounting portion 3 of the case 1, the case 1 is prevented from being deformed in a direction opposite to the contraction direction of thecase 1.

Figure 5:
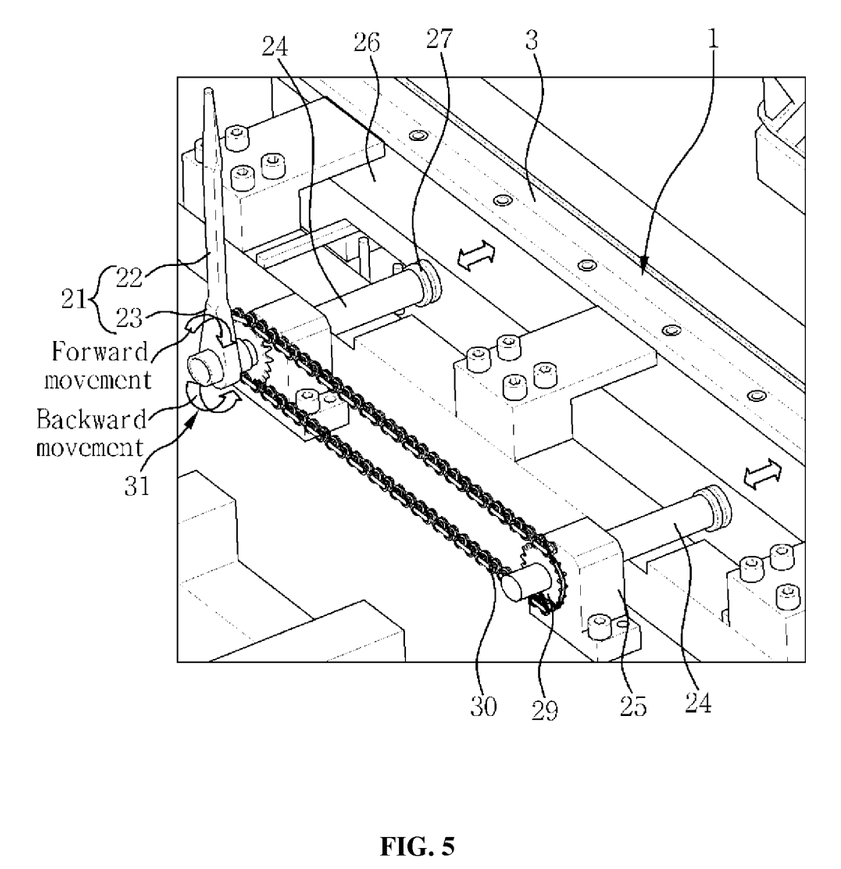
FIG. 5 is a perspective view showing the operation of a front-rear reverse deformation applying block of FIG. 2.
Figure 6:
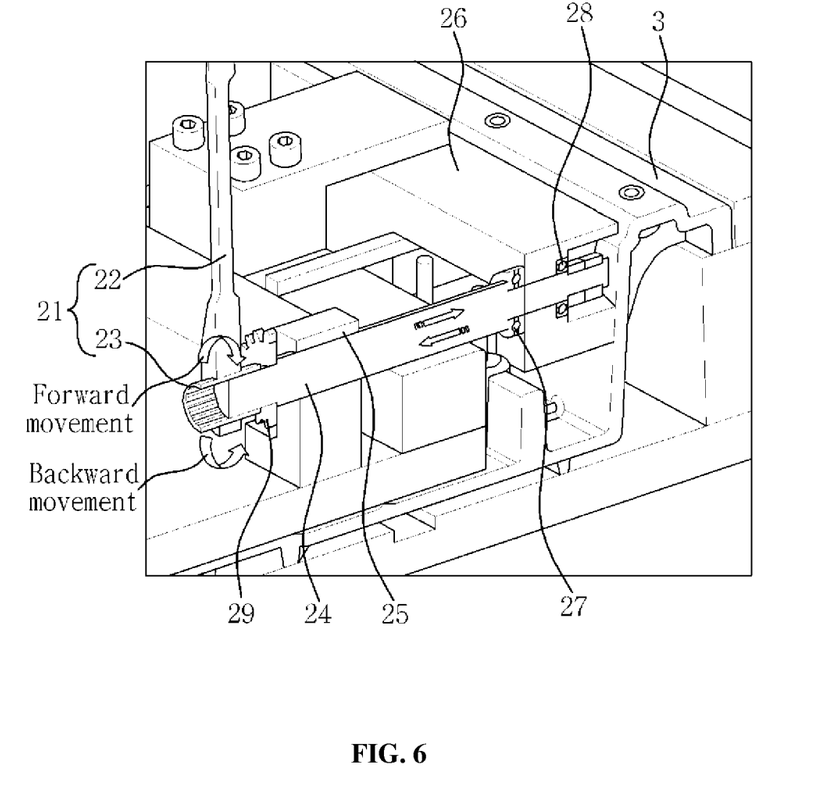
FIG. 6 is a perspective view showing the operation of a left-right reverse deformation applying block of FIG. 2.

FIG. 5 is a perspective view showing the operation of a front-rear reverse deformation applying block of FIG. 2, and FIG. 6 is a perspective view showing the operation of a left-right reverse deformation applying block of FIG. 2. The reverse deformation producing portion 20 prevents or minimizes the deformation occurring in the case 1 after compression molding by applying reverse deformation to the case 1.

By reverse deformation it is meant that the case 1 is deformed toward the outside of the case 1, which is deformed inwardly by contraction when it is compressed molded and cooled, and the application of the reverse deformation means that the mounting portion 3 of the case 1 is pressed from the inside of the case 1 to the outside such that the case 1 is deformed outwardly. To this end, the reverse deformation producing portion 20 includes a reverse deformation applying block 26 for pressing the inside of the mounting portion 3 of the case 1, a driving portion 31 for operating the reverse deformation applying block 26 to apply reverse deformation to the mounting portion 3 of the case 1, and a support frame 40 for supporting the reverse deformation applying block 26 and the driving portion 31.

The reverse deformation applying block 26 is disposed on each of four inner sides of the case 1, after the case 1 is fixedly inserted into the case insertion space of the base 10, to receive the pressing force generated by the driving portion 31 and press the inside of the mounting portion 3 of the case 1, thereby deforming the case 1 outwardly. The reverse deformation applying block 26 may have a rectangular rod structure in which the length is greater than the width and height, and the height and length of the rectangular rod may be determined depending on the size of the case 1. For example, the height of the rod may be smaller than or equal to the depth of the internal space, and the length of the rod may be smaller than or equal to the length of the mounting portion 3 of the case 1.

The driving portion 31 includes a ratchet handle 21 for generating a rotational force, a bolt portion 24 and a nut portion 25 for converting a rotary motion into a linear motion, and a sprocket 29 and a chain 30 for transmitting the rotational force. The ratchet handle 21 has a handle rod portion 22 having a long rod shape and a rotating portion 23 provided at the bottom of the handle rod portion 22 and rotating. The handle rod portion 22 is held by a worker to manually rotate the ratchet handle 21 left and right and may have any shape other than the rod shape as long as it can rotate the rotating portion 23 to generate torque.

The rotating portion 23 may have a circular tubular structure, in which a plurality of gear teeth are formed at regular intervals on the inner circumferential of the rotating portion 23 to transmit the torque generated by the handle rod portion 22 to the bolt portion 24 (in the form of a shaft). Thus, the rotating portion 23 can be engaged with one end of the bolt portion 24 through the gear teeth.

A plurality of bolt portions 24 and a plurality of nut portions 25 are provided on the base 10 at regular intervals in the longitudinal direction of the reverse deformation applying block 26. As each bolt portion 24 is screw-connected to the nut portion 25, the bolt portion 24 converts the rotary motion of the rotating portion 23 generated by the ratchet handle 21 into the linear motion, and thus the bolt portion 24 itself moves forward and backward.

A plurality of gear teeth are formed on one end of the bolt portion 24 such that the bolt portion 24 is engaged with the rotating portion 23. At the same time when the bolt portion 24 is rotated together with the rotating portion 23, the bolt portion 24 can move forward and backward in the lateral direction of the case 1. For example, as shown in FIGS. 5 and 6, when the ratchet handle 21 is rotated right, the rotating portion 23 rotates, and thus the bolt portion 24 rotates in the same direction as the ratchet handle 21. At the same time, the bolt portion 24 moves forward to the outside of the case 1 and presses the inside of the case 1, thereby reversely deforming the case 1.

On the contrary, when the ratchet handle 21 is rotated left, the rotating portion 23 rotates, and thus the bolt portion 24 rotates in the same direction as the ratchet handle 21. At the same time, the bolt portion 24 moves backward to the inside of the case 1 to release the pressing force applied to the inside of the case 1.

The nut portions 25 are fixedly mounted on the reverse deformation applying block 26 at regular intervals such that one end of each bolt 24 is inserted into each nut portion 25. Thus, the nut portion 25 can rotatably support the bolt portion 24 and linearly move the bolt portion 24 in the lateral direction of the case 1.

Moreover, the other end of each bolt portion 24 is fixedly inserted into one end of the reverse deformation applying block 26 to transmit the forward and backward operating force from the bolt portion 24 to the reverse deformation applying block 26. Here, when the other end of the bolt portion 24 is connected to the reverse deformation applying block 26, a radial bearing 28 and a thrust bearing 27 are mounted on the inside and the outside of the reverse deformation applying block 26, respectively, such that the reverse deformation applying block 26 can bear the load in the radial direction of the bolt portion 24 (in the vertical direction of the shaft) through the radial bearing 28. Moreover, the reverse deformation applying block 26 allows for a rotary motion of the bolt portion 24 during contact with the bolt portion 24 through the thrust bearing 27 and receives the linear movement force from the bolt portion 24.

The plurality of bolt portions 24 and nut portions 25 may be arranged at regular intervals in the longitudinal direction of the reverse deformation applying block 26 so as to uniformly transmit the linear movement force of the bolt portion 24 to the reverse deformation applying block 26. Moreover, the sprocket 29 and the chain 30 may be interposed between the ratchet handle portion 21 and the nut portion 25 so as to uniformly transmit the rotational force generated by the ratchet handle 21 to the plurality of nut portions 24 at the same time. For example, the sprocket 29 is located between the rotating portion 23 of the ratchet handle 21 and the nut portion 25 to connect to the bolt portion 24, and the sprockets 29 are connected together by the chain 30. Therefore, when the ratchet handle 21 rotates, the bolt portion 24 connected to the rotating portion 23 of the ratchet handle 21 rotates, and thus the sprocket 29 connected to the bolt portion 24 rotates. Thus, the rotational force is transferred to the sprockets 29 connected to adjacent bolt portions 24 through the chain 30, and the rotational force of the sprockets 29 rotate other bolts 24 at the same time. As a result, the rotational force of the ratchet handles 21 is uniformly transferred to the reverse deformation applying block 26 through the bolt portions 24.

The support frame 40 supports the reverse deformation applying block 26 and the driving portion 31 and functions to confine the reverse deformation applying block 26 and the driving portion 31 in the case 1. The support frame 40 includes a plurality of support plates 41 disposed on the bottom to support the reverse deformation applying block 26 and the driving portion 31, a lower frame 44 for connecting and supporting the support plates 41, and a side member 43 and an upper frame 42 for rotating the lower frame 44 to insert the reverse deformation applying block 26 and the driving portion 31 into the internal space of the case 1.

Here, the support plates 41, the lower frame 44, the side member 43 and the upper frame 42 are integrally connected and operated, and the support frame 40 including these components is connected to one side of the base 10, for example, to the rear end of the base 10 (i.e., the right end when viewed from FIG. 2), by a hinge structure. Thus, the support frame 40 can rotatably insert or remove the reverse deformation applying block 26 and the driving portion 31, which are located on the bottom of the support frame 40, into or from the case 1.

Moreover, a guide member 45 is connected to one upper end of the support frame 40, and a shake prevention guide 12 is disposed on one end of the support 11 to correspond to the length and interval of the guide member 45 so as to prevent the case 1 from being shaken when the support frame 40 is closed, that is, when the reverse deformation applying block 26 and the driving portion 31 are inserted into the case 1 to apply the reverse deformation. Therefore, when the support frame 40 is closed, the guide member 45 is fastened to the shake prevention guide 12, thereby preventing the case 1 from being shaken when the reverse deformation is applied to the case 1.

Next, the operation and effect of the apparatus for preventing deformation of the plastic battery pack case 1 according to the present invention will be described.

After the case 1, which is used to accommodate the battery packs and mounted on the lower portion of the vehicle, is formed by compression molding, the compression-molded case 1 is inserted into the case insertion space of the base 10 such that the mounting portion 3 of the case 1 is received on the support 11 and fixed by the fixing portion 13. Here, when the operating lever 14 of the fixing portion 13 is pushed up toward the inside of the case 1, the rotational force of the operating lever 14 is converted into the pressing force by the arm portion 16, and thus the pressing portion 17 connected to the front end of the arm portion 16 presses the top of the mounting portion 3 of the case 1 by the pressing force, thereby fixing the mounting portion 3 of the case 1.

When the fixing portion 13 fixes the case 1 as the pressing portion 17 is slidably inserted into the front end of the arm portion 16 toward the outside of the case 1, it is possible to prevent the case 1 from being deformed inwardly by contraction until the compression-molded case 1 is subjected to reverse deformation and then allow the case 1 to be deformed outwardly. Then, in order to ensure the internal space of the compression-molded case 1, the support frame 40 is pulled down such that the reverse deformation applying block 26 and the driving portion 31 are inserted into the case 1, and the reverse deformation applying block 26 is moved toward the outside of the case 1 by the driving portion 31, thereby applying the reverse deformation to the case 1.

When the ratchet handle 21 located on each of four inner sides of the case 1 is rotated to apply the reverse deformation to the case 1, the rotating portion 23 formed at the bottom of the ratchet handle 21 rotates in the same direction as the ratchet handle 21, and thus the rotational force of the rotating portion 23 is converted into the linear motion by the bolt portion 24 engaged with the rotating portion 23, thereby transmitting the pressing force of the bolt portion 24 to the reverse deformation applying block 26. Then, the reverse deformation applying block 26 presses the mounting portion 3 located on the inside of the case 1 toward the outside of the case 1 such that the case 1 is reversely deformed, thereby preventing the compression-molded case 1 from being deformed by contraction and ensuring the internal space of the case 1.

To ensure the internal space of the case 1, the bottom and side of the case 1 is rapidly cooled while applying the reverse deformation to the case 1. At this time, the bottom of the product is brought into close contact with the base 10 of the deformation preventing apparatus such that the case 1 is easily fixed and cooled, and air circulation may be performed for more rapid cooling.

Even when the plastic battery pack case 1 processed in the above manner is removed from the deformation preventing apparatus and left as it is, the case 1 is deformed less than or equal to the reverse deformation, and thus it is possible to ensure a suitable/proper internal space of the plastic battery pack case 1 at a desired level.

Next, the present invention will be described with reference to the following examples, but the present invention is not limited to the same.

EXAMPLE

Figure 7:
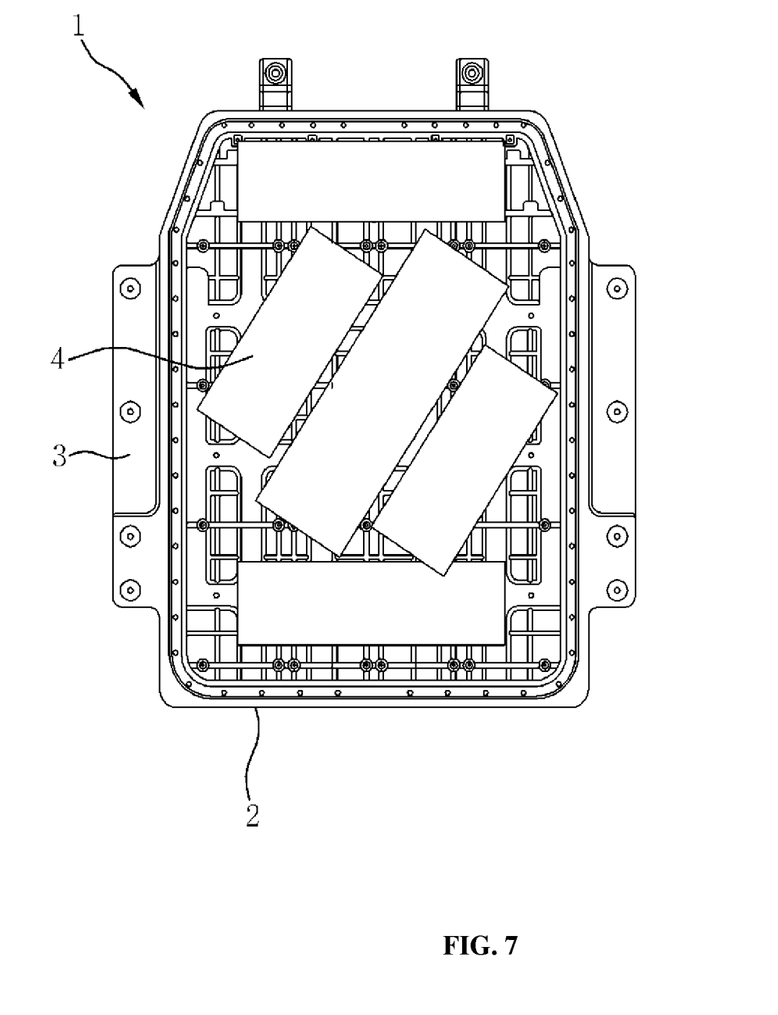
FIG. 7 is a schematic view showing the position of a strand of a carbon composite composition in a mold when a plastic battery pack case is formed by an in-line compounding/extrusion deposition and molding process.

A plastic battery pack case 1 was formed by an in-line compounding/extrusion deposition and molding process in a manner that a strand 4 of a carbon composite composition containing 74.2 wt % polyamide 6, 25 wt % PAN-based carbon fiber, 0.5 wt % butylbenzene sulfonamide, 0.2 wt % phenol-based oxidation stabilizer, and 0.1 wt % ethylene bis stearamide (EBS) and having a relative humidity of 2.8 measured by a sulfuric acid method (96%) was disposed as shown in FIG. 7. The thus formed plastic battery pack case 1 was cooled for 5 minutes while applying the reverse deformation to the plastic battery pack case 1 using the deformation preventing apparatus according to the present invention and then naturally cooled at room temperature for 24 hours. Then, the size of the product was measured from four sides, and their means and standard deviations are shown in Table 1.

COMPARATIVE EXAMPLE

A plastic battery pack case 1 was formed by an in-line compounding/extrusion deposition and molding process in a manner that a strand 4 of a carbon composite composition containing 74.2 wt % polyamide 6, 25 wt % PAN-based carbon fiber, 0.5 wt % butylbenzene sulfonamide, 0.2 wt % phenol-based oxidation stabilizer, and 0.1 wt % EBS and having a relative humidity of 2.8 measured by a sulfuric acid method (96%) was disposed as shown in FIG. 7. The thus formed plastic battery pack case 1 was naturally cooled at room temperature for 24 hours. Then, the size of the product was measured from four sides, and their averages and standard deviations are shown in Table 1.

TABLE 1

| Classification | Width (mm) | | Height (mm) | |
| --- | --- | --- | --- | --- |
| | Average | Standard deviation | Average | Standard deviation |
| Example | 932.59 | 1.38 | 1295.70 | 1.71 |
| Comp. Example | 924.76 | 3.38 | 1246.74 | 5.14 |

Referring to FIG. 1, the average width and height of the case 1 to which the reverse deformation is applied in the Example is greater than that of the case 1 in the Comparative Example, and the standard deviation of the case 1 in the Example is smaller than that of the case 1 in the Comparative Example. Therefore, according to the present invention, it is possible to prevent the plastic battery pack case 1 from being deformed inwardly by contraction until the compression-molded case 1 is subjected to reverse deformation using the fixing portions 13 which can move outwardly and then allow the inside of the case 1 to be deformed outwardly using the reverse deformation applying block 26 and the driving portion 31 for operating the same, thereby absorbing the deformation occurring after compression molding and ensuring a suitable internal space of the case 1 for accommodating the battery packs and other components.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for preventing deformation of a battery pack case for a vehicle, the apparatus comprising:
    inserting the battery pack case into a case insertion space of a base so that a mounting portion of the battery pack case is received on a support and fixed by a fixing portion;
    pushing an operating lever of the fixing portion up toward the inside of the battery pack case;
    in response to pushing the operating lever, transferring, by an arm portion, the rotational force of the operating lever into a pressing force, wherein a pressing portion connected to the front end of the arm portion presses a top of the mounting portion of the battery pack case via the pressing force to fix the mounting portion of the battery pack case; and
    pulling down a support frame so that a pre-strain applying block and a driving portion are inserted into the battery pack case, and the pre-strain applying block is moved toward the outside of the battery pack case by the driving portion to apply pre-strain to the battery pack case and ensure that a suitable internal space in the battery pack casing is provided.

2. The method of claim 1, wherein when the fixing portion fixes the battery pack case, the pressing portion is slidably inserted into a front end of the arm portion toward the outside of the battery pack case.

3. The method of claim 1 further comprising rotating a ratchet handle located on each of four inner sides of the battery pack case to apply the pre-strain to the battery pack case.

4. The method of claim 3 wherein a rotating portion is formed at a bottom of the ratchet handle and rotates in the same direction as the ratchet handle, wherein a rotational force of the rotating portion is transferred into a linear motion by a bolt portion engaged with the rotating portion to transfer the pressing force of the bolt portion to the pre-strain applying block.

5. The method of claim 4, further comprising pressing by the pre-strain applying block the mounting portion located on the inside of the battery pack case toward the outside of the battery pack case so that the battery pack case is pre-strained to prevent the battery pack case from being deformed by contraction and ensuring that a suitable internal space is created in the battery pack case.

6. The method of claim 1 further comprising rapidly cooling the bottom and sides of the battery pack case while applying pre-strain.

7. The method of claim 1 wherein the battery pack case is made by compression molding.

8. The method of claim 1 wherein the battery pack case is made of plastic.

9. The method of claim 1 wherein the battery pack case is installed in an electric vehicle.

\* \* \* \* \*